(12) United States Patent
Goetgeluk et al.

(10) Patent No.: US 12,475,653 B2
(45) Date of Patent: *Nov. 18, 2025

(54) EFFICIENT CAPTURE AND DELIVERY OF WALKABLE AND INTERACTIVE VIRTUAL REALITY OR 360 DEGREE VIDEO

(71) Applicant: Virtuix Holdings Inc., Austin, TX (US)

(72) Inventors: Jan Goetgeluk, Austin, TX (US); Benjamin John Drakes, Cardigan (GB)

(73) Assignee: Virtuix Holdings Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/789,593

(22) Filed: Jul. 30, 2024

(65) Prior Publication Data
US 2024/0394983 A1    Nov. 28, 2024

Related U.S. Application Data

(63) Continuation of application No. 18/467,908, filed on Sep. 15, 2023, now Pat. No. 12,086,942, which is a
(Continued)

(51) Int. Cl.
*G06T 19/00* (2011.01)
*G06F 3/01* (2006.01)
*G06T 15/20* (2011.01)

(52) U.S. Cl.
CPC ............ *G06T 19/003* (2013.01); *G06F 3/011* (2013.01); *G06T 15/205* (2013.01)

(58) Field of Classification Search
CPC .......... G09G 3/20; G09G 3/2044; G09G 3/32; G09G 3/3233; G09G 3/3275; G09G 2320/02; G09G 2320/0233; G09G 2320/0247; G09G 2320/0271; G09G 2340/0435; G09G 2360/16; G09G 3/2055; G09G 3/3266
See application file for complete search history.

(56) References Cited

U.S. PATENT DOCUMENTS

| | | | |
|---|---|---|---|
| 10,860,843 B1 * | 12/2020 | Berme | G02B 27/0179 |
| 11,826,601 B1 * | 11/2023 | Berme | A63B 21/151 |
| 2017/0252642 A1 * | 9/2017 | Matina | A63F 13/214 |

* cited by examiner

*Primary Examiner* — Nelson M Rosario
(74) *Attorney, Agent, or Firm* — Polsinelli PC (57) ABSTRACT

Disclosed are systems and methods for generating a walkable 360-degree video or virtual reality (VR) environment. 360-degree video data is obtained for a real-world environment and comprises a plurality of chronologically ordered frames captured by traversing a first path through the real-world environment. One or more processing operations are applied to generate a processed 360-degree video, which can be displayed to a user of an omnidirectional treadmill. Locomotion information is received from one or more sensors of the omnidirectional treadmill, wherein the locomotion information is generated based on a physical movement on or within the omnidirectional treadmill. Using the received locomotion information, one or more playback commands for controlling playback of the processed 360-degree video are generated. One or more selected frames of the processed 360-degree video are rendered for presentation and display to the user, based on the one or more playback commands.

20 Claims, 4 Drawing Sheets

Related U.S. Application Data continuation of application No. 18/097,108, filed on Jan. 13, 2023, now Pat. No. 11,823,334, which is a continuation of application No. 17/327,240, filed on May 21, 2021, now Pat. No. 11,557,094.

(60) Provisional application No. 63/028,160, filed on May 21, 2020.

EFFICIENT CAPTURE AND DELIVERY OF WALKABLE AND INTERACTIVE VIRTUAL REALITY OR 360 DEGREE VIDEO

CROSS-REFERENCE TO RELATED APPLICATIONS

This application is a continuation of U.S. Non-Provisional patent application Ser. No. 18/467,908, filed Sep. 15, 2023, which in turn is a continuation of U.S. Non-Provisional patent application Ser. No. 18/097,108, filed Jan. 13, 2023, now issued as U.S. Pat. No. 11,823,334, which in turn is a continuation of U.S. Non-Provisional patent application Ser. No. 17/327,240, filed May 21, 2021, now issued as U.S. Pat. No. 11,557,094, which claims the benefit of priority to U.S. Provisional Application No. 63/028,160 filed May 21, 2020 and entitled "EFFICIENT CAPTURE AND DELIVERY OF WALKABLE AND INTERACTIVE VIRTUAL REALITY OR 360DEGREE VIDEO," the disclosures of which are herein incorporated by reference in their entirety.

TECHNICAL FIELD

The present disclosure pertains to immersive video, and more specifically pertains to systems and methods for providing a walkable or ambulatory video experience and/or virtual reality (VR) experience.

BACKGROUND

Virtual reality (VR) systems are becoming increasingly popular, providing users an immersive experience that is often associated with a 360-degree field of view, wherein a user is free to direct their gaze to any portion of a larger overall scene, e.g., along 360 degrees of left-right and/or up-down freedom. This 360-degree field of view can be filled with real-world content such as video or image data that has been captured by one or more cameras and/or can be filled with computer generated content such as animations and other renderings. While these virtual reality environments have become increasingly complex and sophisticated, the problem of locomotion has yet to be adequately addressed such that everyday users can fluidly and realistically move through or within a virtual reality environment.

Existing techniques, such as photogrammetry, attempt to solve this problem by scanning a desired real-world environment in order to capture data suitable for building a 3D geometry or a 3D representation of the desired real-world environment. Photographs or other image and video data are then combined with or overlaid upon the computer-generated 3D representation in order to create the virtual environment. However, photogrammetry is often inaccurate, due to factors such as errors in the 3D scanning processes, the 3D rendering process, or the image data capture process; the 'skinning' process which combines the image data with the 3D render; or some combination of the above.

Accordingly, photogrammetry most often yields virtual environments that are glitchy, incomplete, or otherwise unconvincing in terms of immersion and photorealism. Additionally, photogrammetry can be massively computationally intensive to the point of being impractical. For example, a single frame of a photogrammetrically rendered scene can be in excess of several gigabytes, meaning that both storage and real-time processing/rendering can be process bottlenecks when delivering a virtual environment to a user. Accordingly, it would be desirable to provide a photorealistic, interactive and/or ambulatory virtual environment at both a low cost and a low capture complexity.

BRIEF DESCRIPTION OF THE DRAWINGS

In order to describe the manner in which the features of the disclosure can be obtained, a more particular description of the principles briefly described above will be rendered by reference to specific examples thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

Disclosed herein are systems and methods for capturing and providing a walkable (also referred to herein as "ambulatory") and interactive 360-degree video experience. In some embodiments, the walkable 360-degree video experiences can include virtual reality (VR) and/or augmented reality (AR) experiences, and can be compatible with various different VR/AR platforms, devices, systems, headsets, etc. Moreover, it is noted that although the following discussion makes reference to "360-degree video" and "360-degree cameras," this is not intended to be construed as limiting—aspects of the present disclosure are also applicable to other immersive video captures having slightly less than a full 360-degree field of view.

Full-featured virtual reality worlds are immersive environments, generally allowing a user the experience to walk and move within the world as they please, often subject only to the confines or boundaries of the VR environment itself. However, in order to provide this freedom of movement, VR environments must be individually built as complex three-dimensional (3D) objects—a process that often requires a significant expenditure of time and money. In a traditional approach, VR and other 360-degree immersive environments are wholly computer generated, built from a plurality of textured (and often animated) 3D objects. This traditional approach to constructing VR environments shares many similarities with creating animated movies and video games, both of which are well-known for requiring vast amounts of computational time/power and man hours. Indeed, initial mainstream adoption of VR experiences was driven in part by video game studios and developers, due to the transferability of the highly specialized skills needed to create and model 3D VR environments.

However, the complexity and difficulty of creating 3D-modeled VR environments creates significant barriers to entry and other accessibility problems at both the content creation and content consumption end. In terms of content creation, it can be difficult for new developers to assemble the necessary capital and expertise to build a fully featured and immersive 3D-modeled VR environment; likewise, the same is true of individual users (or owners of a VR device) to an even greater degree. In terms of content consumption, a limited number of content creators leads to a commensurately limited amount of VR content, with end users largely forced to choose from a selection of VR content designed with business principles and mass-appeal in mind—not the specific interests, desires, and memories of any individual user.

Some recent approaches, such as photogrammetry, seek to improve upon this problem by capturing 3D scan data of real-world environments and then using the scan data as a basis for building a 3D model or representation the real-world environment. However, such approaches only alleviate a portion of the burden described above and remain fundamentally constrained by the same difficulties associated with the 3D-modeling process. In other words, photogrammetry and similar techniques may make 3D-modeling and VR environment construction more expedient, but they nevertheless still adhere to the traditional approach of using a plurality of textured and/or animated 3D objects.

Moreover, VR environments based on both traditional 3D-modeling techniques (i.e., from the ground up) and photogrammetry techniques (i.e., based on 3D scan data) are computationally intensive not only in their construction, but also in their rendering/presentation to a VR user. Current VR systems and devices still largely require dedicated, and often specialized hardware in order to provide the necessary computational power to render a VR environment in a realistic, immersive, and convincing way. This further limits the choices and options available to VR content consumers, as even those who own a VR device will not necessarily be able to enjoy all of the VR content that has been published.

Some approaches to these VR accessibility and customizability problems seek to address the issue by reducing the interactivity options made available to a user. For example, a VR environment might permit only head movements, such that a user is free to look around the scene as they please but are locked to a fixed location/perspective within the scene, unable to walk or otherwise move about the virtual world. Such an approach undermines the immersive nature of VR experiences, which is driven in large part by the user's ability to roam about the VR environment and experience it from different perspectives—to feel that they are actually inside of the virtual world, not merely a fixed observer. Accordingly, it is an aspect of the present disclosure to address these problems and more, while maintaining this freedom of choice from which immersivity depends.

Disclosed herein are systems and methods for providing immersive and realistic VR and VR-like experiences that are efficiently and easily adaptable to present a walkable virtual experience within an environment created from user-generated and/or user-selected 360-degree video content. Because the VR experience (and also VR environment) can be created from existing or otherwise standard 360-degree video footage, users are free to adapt a wide array of different types of content, experiences, and environments to virtual reality. This flexibility and freedom of choice allows many more real-world environments to be adapted into virtual ones, including those that are uniquely personal to a given user. For example, a memory, a vacation, the interior of a home, etc., can all be captured with a 360-degree camera and used to provide a walkable VR environment that otherwise would have been cost-prohibitive or inadvisable from a developer's business perspective.

To provide an immersive and realistic VR experience for a given 360-degree video, various pre-processing, processing, and/or editing steps can be performed to generate a walkable VR environment from a raw/input 360-degree video captured from one or more 360-degree cameras. In some embodiments, the presently disclosed approach can utilize a path-based approach, in which the 360-degree camera traverses one or more paths through a desired real-world environment and simultaneously captures the video footage that will later be used to generate the walkable VR environment.

Using a VR system, device, headset, etc., the walkable VR environment is subsequently presented to a user. The user interacts with and travels through the VR environment along a route that is the same or similar to one or more of the captured paths traversed by the 360-degree camera in the real-world environment. However, the user is not a passive viewer of the video captured by the 360-degree camera and does not have to travel along the path in either the same direction, sequence (e.g., in scenarios with multiple branched paths), or speed with which the 360-degree camera originally traversed the corresponding real-world environment. Instead, the user is given active control of their VR experience and can interact with and move through the VR environment as they desire, with the user's movements or steps (e.g., as determined by the user's VR device) used as control inputs.

Although a user's VR experience is partially constrained to follow the same path that the 360-degree camera took through the real-world environment, aspects of the present disclosure are directed to minimizing the effect of being bound to a fixed path and delivering an immersive and realistic walkable VR experience in spite of this constraint. It is contemplated that a 360-degree video can provide the whole or a substantial whole of the basis from which the presently disclosed walkable VR environments are generated, although in some embodiments one or more input 360-degree videos can be augmented, edited, and/or otherwise combined with one or more additional video portions, computer generated graphics, etc., as will be described in greater depth below.

360-Degree Video Footage

In general terms, given a selected or desired location, one or more 360-degree cameras can be utilized to capture the requisite video data, for example by moving the camera along one or more paths through the environment of the selected location. Given the one or more paths, a lightweight and computationally efficient VR experience can be created to correspond with the one or more camera paths. In other words, aspects of the present disclosure provide for delivering to a user the impression of a fully open VR/360-degree video environment experience, but generally constrains the user's movement to be substantially along one of the capture paths originally traversed by the camera(s) that captured the 360-degree video footage of the selected location.

The 360-degree camera can be volumetric or can be conventional. In some embodiments, one or more cameras can be utilized, and it is additionally contemplated that one or more cameras can be employed to capture non-360-degree video which can later be edited or stitched together to form a 360-degree video substantially identical to that which would be captured by a dedicated 360-degree video camera.

As mentioned previously, the 360-degree camera can be moved along one or more desired paths or tracks while it captures video data of the surrounding vicinity. The captured video data, either in its raw form or a processed form, can subsequently be used to provide one or more walkable/ambulatory VR environments, as will be described in greater depth below. The 360-degree camera can be manually moved (e.g., pushed, carried, etc.) and/or mechanically moved (e.g., on a car, drone, vehicle, etc.). Manual movements can be performed in accordance with the one or more desired paths, which can pre-determined, spontaneously determined, or some combination of the two. Mechanical movements can be manually or autonomously controlled such that the 360-degree camera is moved along the one or more desired paths.

In general, the 360-degree camera can be moved along the one or more desired paths at a constant rate of speed, which in some embodiments can be selected to correspond to an average walking pace of a target or intended audience of the captured video data. Additionally, the 360-degree camera can be moved through the environment of the selected location at a position or captured point of view (POV) that corresponds to an average eye level of the intended audience of the captured video data. In some embodiments, the 360-degree video data can be captured at multiple different walking paces and/or multiple difference eye levels. Computational augmentation can be utilized to achieve the same or similar effect as obtaining multiple different distinct video captures, e.g., by shooting raw footage at a higher resolution than the playback resolution that will be used in the presently disclosed walkable experience, the system has the flexibility to crop the higher resolution raw footage as needed in order to simulate different, lower resolution POVs. In some embodiments, the computational augmentation can include one or more machine learning (ML) and/or artificial intelligence (AI) techniques. For example, an ML system can be trained (or obtained in pre-trained fashion) to generate walkable and/or interactive virtual environments from one or more of the individual frames (i.e., still frames) of the 360-degree video. Based on the visual contents of the various 2D samples taken from the frame(s) of a 360-degree video, the trained ML network or ML system can generate a corresponding 3D geometry that represents or approximates the two-dimensional scene. Using this ML-generated 3D geometry, in some embodiments the presently disclosed walkable 360-degree videos and/or walkable VR experiences can be expanded to permit more substantial movement and user exploration off of the fixed virtual path that corresponds to the capture (i.e., traversal) path taken by the 360-degree camera when originally obtaining the 360-degree video(s).

It is appreciated that specific capture parameters can be adjusted in order to tailor the virtual reality environment to provide a more immersive experience to an end user as is needed or desired.

In some embodiments, the one or more paths along which the 360-degree camera is moved may take the form of a substantially straight line, although curved and non-linear paths can also be utilized without departing from the scope of the present disclosure. Regardless of the geometry of a given path, the path can be pre-determined or can be determined in real-time. For example, a pre-determined path might correspond to a path through a scenic landscape that is planned to have a maximum visual impact, or a path through a movie set that is planned to capture several desired scenes or areas. A path determined in real-time can be dynamically responsive to one or more sensed or environmental parameters, and/or can be random or otherwise discretionary.

In some embodiments, once the desired video data has been captured, it can be offloaded from the 360-degree camera and imported into a video editing or processing application, which can perform various combinations of pre-processing, editing, etc. Video pre-processing steps or operations can occur in combination with or separate from any human guided video editing steps. For example, one or more video pre-processing steps might automatically be applied when the raw captured video is imported from the 360-degree camera (and into the video editing application) but before any manual editing steps are performed. The result of this overall pre-processing and video editing process is to convert the raw captured video into a suitable input video for providing the walkable or ambulatory virtual reality environments of the present disclosure. In embodiments where the raw captured video data is not from a 360-degree camera but is instead obtained from multiple clips/cameras having a smaller field of view (FOV), the pre-processing steps can include stitching the individual FOVs into a 360-degree video.

Pre-processing steps can further include, but are not limited to stabilization, adjusting playback speed, masking/cropping, top and tailing, and mirroring (discussed in greater depth below). Note that the operations listed above are not contemplated as strictly limited to being performed as pre-processing operations; one or more of the pre-processing steps can be performed as a subsequent editing or processing step without departing from the scope of the present disclosure.

Stabilization can be automatically performed to remove vibrations or shakiness induced, for example, by the gait of a human operator or vibrations of a mechanical carrier of the 360-degree camera. By stabilizing the captured 360-degree video footage, a more "static" baseline can be established in order to better support realistic perspective changes that will be rendered by, for example, a playback VR device/headset—it can be disorienting if the playback VR device renders perspective changes (e.g., based on the movements of the user of the VR device) on top of a non-stabilized baseline 360-degree video footage that has its own perspective changes.

Playback speed can be increased or decreased in order to achieve one or more desired perceptual effects in the presentation of the captured 360-degree video as a walkable VR experience. More particularly, by more closely matching the playback speed of the 360-degree video with the walking/movement speed of a user who is viewing the 360-degree video on a VR device, the VR experience can be presented in a more interactive fashion (e.g., because adjusting the video playback speed allows the user to move along the path at a greater or lesser speed than that of the 360-degree camera when originally capturing the scene). In some embodiments, playback speed can be adjusted independently from video capture (e.g., after), for example by dropping frames, duplicating frames, interpolating frames, or some combination of the above. Note also that the video capture parameters themselves can also be used to adjust playback speed, given that each set of video capture parameters has its own inherent playback speed when presented in a default or unaltered fashion. As such, playback speed can also be accounted for at the moment of video capture by adjusting one or more of the speed with which the 360-degree camera is moved along the path(s), the video capture framerate, etc. In some embodiments, it is possible that a playback speed compensation can be applied during video capture, during video processing/editing, or both.

In some embodiments, a process referred to as top and tailing is utilized to remove the beginning and/or end portion(s) of the raw 360-degree video recording, for example because in those portions there may be no motion of the camera along the path (i.e., top and tailing removes frames where the 360-degree camera was stationary or otherwise capturing undesired frames/material, both before its movement began and/or after movement ceased). In this manner, the captured video file is reduced only to the portion which contains the desired movement along the one or more desired paths.

In some embodiments, masking or cropping can be applied to remove or hide image data of the operator or vehicle that was used to move the 360-degree camera along the desired path. In general, a 360-degree camera will capture the full environment around it, meaning that any apparatus or infrastructure associated with supporting and moving the camera should be digitally removed in order to provide the most immersive experience possible. In some embodiments, the masking/cropping might rely upon neighboring video frames to provide reference data for an overlay to mask out the undesired portions of the captured video data. Some 360-degree cameras may apply one or more masking algorithms natively or onboard. In some circumstances, if the quality of onboard masking is acceptable, then masking/cropping at the video pre-processing and editing stage may not be needed. However, it is contemplated that masking/cropping can still be performed as a later step even if also performed onboard the 360-degree camera, e.g., to remove any artifacts left behind or to remediate a poorly masked video that is provided as native output of the 360-degree camera used to capture the given video.

Generating Walkable Virtual Experiences: Mirroring

Mirroring can be performed to support user movement in the forward and backward directions. In other words, mirroring supports user movement in 1) the same direction that the 360-degree camera moved in during capture and 2) the opposite direction that the camera moved in during capture. In some embodiments, the mirroring step creates a single video file that includes both the "forward" direction (i.e., the footage played in the same chronological order in which it was captured) and the "backward" direction (i.e., the footage played in reverse chronological order from which it was captured). By creating this single, mirrored file, the computational workload of having to perform an on-demand or real-time rendering of chronologically reversed frames whenever the user travels in a direction opposite from the capture direction can be avoided, as is explained in greater depth below. In addition to the previously mentioned scenario in which the computational workload would be burdensome or undesirable, the creation and use of mirrored video files can also be useful when the final video playback application or rendering engine at the VR device does not support or is not optimized for reverse video playback.

In some embodiments, mirroring can begin by duplicating the captured 360-degree video clip, at which point the duplicated clip is then chronologically reversed (i.e., first frame of duplicated clip becomes last frame of reversed clip, second frame of duplicated clip becomes second to last frame of reversed clip, etc.). It is noted that it is possible to apply mirroring as the first pre-processing step, for example if the chronologically forward video will subsequently be processed/augmented separately or differently from the chronologically reversed video. For example, if a 3D graphical element such as a clock is superimposed on the video footage, it could be desirable to process the forward and reverse video footage separately in order to better maintain the immersivity of the user (i.e., by better maintaining the illusion of forward temporal flow). In some embodiments, mirroring can be applied as a final or penultimate pre-processing step in order to avoid having to perform any edit operations on both the forward playing, original version of the video and the reverse playing duplicated version of the video, i.e., the reversing operation can be performed after the completion of any editing and/or augmentation applied to the original, forward-playing video.

The playback speed of the reversed version of the video can be maintained to be the same as the playback speed of the forward-playing version. In some embodiments, the playback speed of the reversed version of the video can be modified from the playback speed of the forward version. For example, if a walkable VR experience is generally designed for the user to walk in only a single direction, then it may be beneficial to slow the reversed version based on the assumption that the user might turn around and reverse direction only temporarily, e.g., because the user is more likely to turn around and observe the scene rather than actively travel in the reverse direction.

After duplication, the original (also referred to herein as the "forward") video clip and the reversed video clip are the same size, i.e., they both consist of an equal number of constituent frames. The mirroring operation then proceeds to a combining operation.

In the combining operation, the first frame of the reversed video clip is deleted—note that the first frame of the reversed clip is identical to the last frame of the forward clip—and the remainder of the reversed clip is then appended to the forward clip to yield a composite, mirrored clip.

A mirror or transition frame is used to denote the point at which the mirrored video clip transitions between the forward video portion and the reversed video portion, i.e., where the reversed portion was appended to the forward portion. In some embodiments, the transition frame can be identified as or set equal to the last frame of the forward clip.

For example, consider the following case: if the forward video clip is five frames long:

$$[x_1\ x_2\ x_3\ x_4\ x_5]$$

then the reversed clip is generated by taking the frames of the forward clip in reverse order and deleting the first frame of the reversed clip, yielding:

$$[x_4\ x_3\ x_2\ x_1]$$

Therefore, the mirroring operation in this example yields a 9-frame mirrored clip:

$$[x_1\ x_2\ x_3\ x_4\ x_5\ x_4\ x_3\ x_2\ x_1]$$

where the transition frame is $X_5$ (note that the capitalization is for purposes of clarity of illustration; $X_5$ and $x_5$ are identical). The transition frame $X_5$ s therefore seen to mark the point at which the mirrored clip transitions between the forward clip and the reversed clip.

By virtue of the transition frame also being the final frame of the forward clip, in some embodiments the transition frame can be used to implement a hard limit to prevent a user of the walkable VR environment from walking "past" the transition frame and into the reversed direction.

Presentation of the Walkable Virtual Experience; User Locomotion

After the mirroring process is completed, the mirrored video can then be output and/or stored in one or more desired file formats, e.g., one which is compatible with the final video playback application or rendering engine that will be used to provide the ambulatory/walkable video within the VR environment. For purposes of the present example, subsequent reference will be made to a VR engine which receives the mirrored video file and provides the ambulatory/walkable VR environment to a user.

In some embodiments, one or more mirrored video files (or other processed video files and/or 360-degree video files of the present disclosure) can be stored locally at the VR system, device, headset, etc., that is utilized to provide the walkable virtual experience to a user. For example, the 360-degree video file(s) could be stored in a local memory of the playback or display system, on a local network storage, or otherwise stored and made locally accessible to the VR system. In some embodiments, one or more mirrored video files or other processed/360-degree video files of the present disclosure can be provided in and accessed from cloud storage, over the internet or other external communication networks, etc. For example, a user can stream one or more 360-degree video files to their VR system or device using an internet or cellular connection, such that one or more of the 360-degree video files (which can consume large amounts of storage space) are not required to be stored locally at the VR system or device. It is also contemplated that a mixture of local storage and streaming/cloud/remote storage can be utilized, e.g., storing local caches of recently played or queued 360-degree videos, storing user selected videos such as 'Favorites', etc., with the remainder streamed on-demand to the VR system or device from one or more cloud storage locations.

The VR engine can utilize the mirrored video file to provide immersive and realistic locomotion to a user within the VR environment, as will be discussed in the context of the example below. The following example makes reference to a scenario in which mirroring is performed, but is equally applicable to scenarios in which a mirroring step is not performed (e.g., in some embodiments the VR engine can utilize only a forward video file and can itself retrieve and render appropriately reversed frames in real-time).

In order to render movement through the walkable VR environment, the VR engine provides playback of the mirrored video file based on user locomotion information. The user locomotion information can be provided by a VR device or headset, one or more external sensors or cameras, or some combination of the above. Based on the user location information, the VR engine can be configured to adjust one or more of a video playback state (e.g., speed, field of view or point of view within the 360 degrees, etc.) and a video playback position (e.g., the particular frames of video to which the playback state parameters are applied).

These adjustments are made based on one or more user inputs representative of the user's desired locomotion within the virtual reality environment, where the user inputs are received or detected by the VR engine. For example, these user inputs can include a direction of gaze (e.g., detected by a VR headset, one or more VR base station sensors, a CAVE system, etc.), a torso/hip orientation (e.g., detected by one or more VR base station sensors or by dedicated sensor hardware), a direct control input made by the user (e.g., via a hand controller or a virtual controller/menu), and a lower limb movement.

Figure 1:
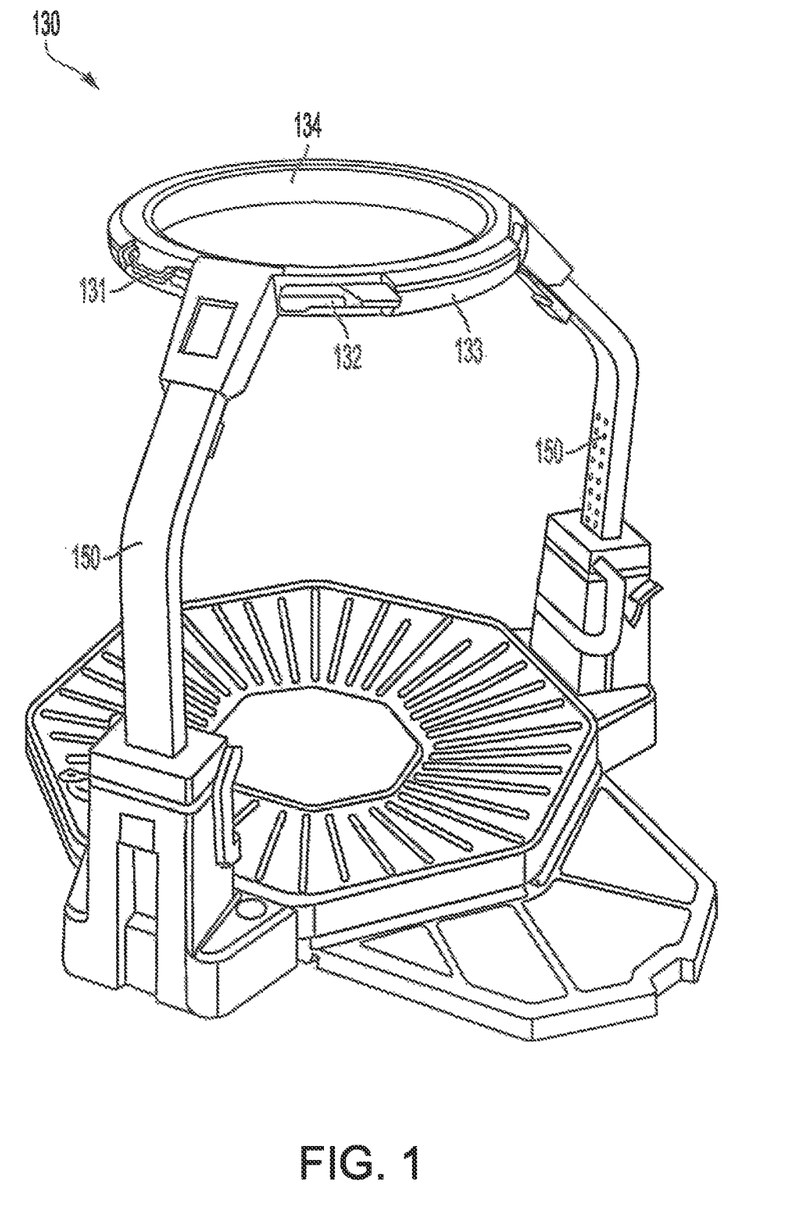
FIG. 1 depicts an exemplary omnidirectional locomotion system according to the present disclosure.

Lower limb movements, such as movements corresponding to or simulating a desired user locomotion or ambulatory behavior to be executed within the virtual reality environment, can be detected in a similar manner as described above, e.g., by one or more VR base station sensors, a CAVE system, dedicated sensor hardware etc., or can be detected via an omnidirectional treadmill, an example of which is depicted in FIG. 1 and is also described in PCT/US2015/021614 and U.S. Ser. No. 14/663,433, both of which are incorporated by reference herein in their entirety.

FIG. 1 illustrates an example omnidirectional locomotion system 130, which is provided for purpose of illustration and is not intended to be construed as limiting—variations to the design of omnidirectional locomotion system 130 can be utilized, along with different omnidirectional locomotion system designs, in both instances without departing from the scope of the present disclosure. Halo 134 of omnidirectional locomotion system 130 can include one or more handles 131, which can aid in adjusting a height of halo 134 by extending or shortening one or more struts 150. Halo 134 can also include a lever 132 for opening and closing a door 133 by which a user can enter and exit omnidirectional locomotion system 130. In some embodiments, lever 132 can be a lift-up tail design or can be spring-loaded. Lever 132 can further stay in an upright position when not closed for added safety. Door 133 and lever 132 can further include a safety pin (not shown) for additional safety against accidental opening. In embodiments in which omnidirectional locomotion system 130 is an omnidirectional treadmill, a platform 170 can comprise an omnidirectional treadmill track configured to permit and measure locomotion of a user 160 coupled or harnessed within the halo 134.

In some embodiments, the vertical supports can be a bungee cord or suspended spring system. In this embodiment, a minimal resistance would be applied to the halo when a user is in the crouch position. Upon a user moving to the stand position from the crouch position, the resistance on the halo would subside. In another embodiment, vertical movement can be achieved by a pivot arm system. A pivot can be attached to the struts on either the vertical support or the halo. Upon a user moving to the crouch or stand position, the pivots can actuate enabling the vertical movement of the user. In another embodiment, vertical movement can be achieved by a magnetic levitation system. The struts can be attached to the vertical support by magnets. The magnetic field created by the magnetic polarization can enable vertical movement. In another embodiment, vertical movement can be achieved by hydraulic actuation. The horizontal struts can be attached to the vertical supports by hydraulics. Vertical movement of the user can be actuated by the hydraulics. In another embodiment, vertical movement can be achieved by compressed gas. Vertical movement can be achieved by actuating a regulator causing the release and restriction of the flow of compressed gas.

Returning now to a discussion of the VR engine and the ambulatory/walkable 360-degree video of the virtual reality environment, the physical, real-world locomotion of a user of omnidirectional treadmill 130 can be determined from data collected from one or more sensors. The one or more sensors can include, for example, inertial measurement units (IMUs), capacitance sensors, ambient light sensors, magnetic tracking sensors, acoustic sensors, pressure sensors, optical tracking sensors, Hall Effect sensors, infrared sensors, etc. In some embodiments, one or more of the sensors can be removably attached to halo 134 (the user's hip harness); to specialized footwear provided to the user (e.g., footwear containing left and right IMUs); to a handheld or other accessory provided to the user (e.g., a controller or a prop); to the user's head, torso, arms, legs; or to any other location on the user or a user accessory. In some embodiments, one or more of the sensors can stream raw measurement data to an aggregator board, e.g., at 100 Hz.

In general, the physical, real-world user locomotion inputs can be divided into a speed component and a direction component, although other divisions and categorizations of the user locomotion inputs are possible without departing from the scope of the present disclosure. In the context of the present example, the speed component and the direction component of real-world user locomotion are handled differently by the VR engine when it generates corresponding virtual reality user movements. The speed component and direction component of real-world user locomotion, and their different treatments by the VR engine, are discussed below.

The speed component of real-world user locomotion can be measured in feet per second, miles per hour, meters per second, kilometers per hour, or any other unit as desired. In some embodiments, the measured speed component of real-world user locomotion can be used directly by the VR engine as the virtual reality speed of the user within the 360-degree video, or a scaling factor or other adjustment algorithm can be applied.

In some embodiments, the speed component of user locomotion on omnidirectional treadmill 130 can be determined from data collected from one or more IMUs coupled to or otherwise disposed on or near the user of the omnidirectional treadmill 130. For example, one or more IMUs can be removable attached to the user's footwear, and the speed component can be determined as an instantaneous measurement from these IMUs or as a windowed measurement from these IMUs (e.g., aggregated over the past one second). In some scenarios, platform 170 might comprise an omnidirectional treadmill track, in which case the speed component of user locomotion can be determined by measuring the speed of the treadmill track, by measuring the angular velocity of one or more roller supports of the treadmill track, by measuring the angular velocity of one or more drive motors of the treadmill track, etc.

Based on the assumption that the orientation of the user's hips corresponds with their direction of locomotion, and recalling that halo 134 acts as a hip harness for the user, the direction component of real-world user locomotion can be obtained by measuring the rotation or angular displacement of halo 134 with respect to at least one reference point, which for example might define a North or 0° direction. This reference point can be static, e.g., North/0° orientation corresponds to the front most strut 150 of omnidirectional treadmill 130, or it can be dynamic, e.g., North/0° orientation corresponds to orientation in which the user physically entered halo 134.

However, regardless of how this real-world reference point is defined, the VR engine cannot make use of real-world user locomotion direction measurements until a calibration process has been performed. In some embodiments, the calibration process can create a virtual reference point and link it with the real-world reference point on omnidirectional treadmill 130. For example, on the basis of this linkage, a 90° clockwise rotation in the real-world/on omnidirectional treadmill 130 will cause a corresponding 90° clockwise rotation in the virtual reality world of the 360-degree video. This virtual reference point can be chosen arbitrarily. However, recall that the 360-degree video is walkable only along the path traversed by the camera when originally capturing the 360-degree video—accordingly, in some embodiments the 360-degree video may be provided with a virtual reference point, for example, such that virtual North/0° is defined as the forward direction of the camera path (if the camera path curves, then virtual North/0° may more accurately be defined as the forward direction of the camera path at t=0). On this basis, the real-world direction of user locomotion can be translated by the VR engine into a virtual direction of user locomotion within the 360-degree video.

Coupled with the previously described real-world user locomotion measurements, the VR engine may obtain measurements indicative of a real-world direction of user gaze in order to thereby provide an immersive virtual reality environment within the 360-degree video, as it is often the case that an individual's direction of motion (e.g., due North) is markedly different from the individual's direction of gaze (e.g., looking over their left shoulder, due West). In particular, based on a calculated difference between the direction of real-world locomotion and the direction of real-world gaze, the VR engine renders an appropriate field of view within the 360-degree video. In some embodiments, the real-world direction of user gaze can be measured from a VR headset or VR base station/sensing units associated with the user, although in some embodiments one or more of the aforementioned sensors associated with omnidirectional treadmill 130 can be utilized to measure the real-world direction of user gaze.

The real-world direction of user gaze can be measured with respect to the same reference point as the real-world direction of user locomotion. If different reference points are used, then the VR engine can utilize the offset between the different reference points in order to maintain the immersive virtual reality experience within the 360-degree video. In some embodiments, a measured real-world direction of user locomotion can be obtained with respect to a first reference point as described above, and subsequently, the real-world direction of user gaze can then be determined with respect to the measured current real-world direction itself; in other words, only the offset between the two is measured, which can increase accuracy by avoiding potential error induced by having different reference points/reference frames for user gaze and user locomotion.

In some scenarios, it may not be possible to measure the direction of real-world user locomotion (e.g., via halo 134 or a hip-belt), or it may not be possible to calibrate real-world user locomotion with the 360-degree video of the virtual environment. In either of these cases, the VR engine can operate based off of only the real-world user direction of gaze and speed of locomotion. In particular, the VR engine can render playback of the 360-degree video such that the user moves through the virtual reality environment only in the direction in which they are currently facing. In other words, whenever VR engine receives as input a speed component of real-world user locomotion, the user will be correspondingly virtually moved through the 360-degree video in their current direction of gaze.

The various discussions above have contemplated various configuration scenarios in which the VR engine is tasked with determining a single appropriate virtual movement to render for a user within the virtual reality environment of the 360-degree video. In other scenarios, the VR engine must render a transition between a first virtual movement state and a second virtual movement state.

For example, assume that virtual North corresponds to the forward-playing portion of the mirrored 360-degree video, and further assume that the VR engine needs to render a user reversing their virtual movement direction from virtual North to virtual South. In order to do so, the VR engine must immediately switch from playing the forward portion of the mirrored video to playing the reversed portion of the mirrored video. More particularly, the VR engine must immediately skip from the currently rendered frame within the forward portion to the exact frame within the reversed portion of the mirrored video that corresponds to the now reversed locomotion of the user—bypassing any intervening frames and immediately playing the mirrored video from the new frame within the reversed portion so long as the movement towards virtual South continues.

In some embodiments, the transition/mirror frame can be utilized to ensure that the VR engine executes this skip seamlessly, such that the user perceives a natural change in heading without any skipping, lagging, glitching, or frame jumping. For example, the following equation can be used to calculate the new frame within the mirrored video to which the VR engine must skip and immediately initiate playback from (recalling that the transition frame is given by the frame number of the last frame in forward-playing portion of the mirrored video file):

$$\text{new frame} = \text{transition frame} + [\text{transition frame} - \text{current frame}] \quad (1)$$

Returning to the earlier example of the nine-frame mirrored video file represented as [$x_1$ $x_2$ $x_3$ $x_4$ $X_5$ $x_4$ $x_3$ $x_2$ $x_1$], consider a scenario in which a user begins in an initial state where he is facing virtual North and the VR engine is currently rendering the second frame of the mirrored video file (with the rendered frame of the mirrored video file indicated at the underline):

[$x_1$ $\underline{x_2}$ $x_3$ $x_4$ $X_5$ $x_4$ $x_3$ $x_2$ $x_1$]

Still moving virtual North, the VR engine advances one frame forward in the mirrored video file and renders:

[$x_1$ $x_2$ $\underline{x_3}$ $x_4$ $X_5$ $x_4$ $x_3$ $x_2$ $x_1$]

The user then reverses their direction of locomotion and walks virtual South—the VR engine renders:

[$x_1$ $x_2$ $x_3$ $x_4$ $X_5$ $x_4$ $x_3$ $\underline{x_2}$ $x_1$]

placing the user in frame #8 of the mirrored video file—an immediate transition from frame #3 (located in the forward portion of the mirrored video) to frame #8 (located in the reversed portion of the mirrored video).

Using Eq. 1 in the context of the present example, the new frame number is given as: new frame=transition frame (5)+[transition frame (5)−current frame (3)]=7.

However, recall that 'new frame' defines where video playback is initiated from, and is not necessarily the frame that is to be rendered by the VR engine. In other words, initiating playback at frame 7 can, in some embodiments, cause the VR engine to immediately advance and render the next frame in the mirrored video file, which here is frame #8.

Eq. 1 and the above example are applicable to various different locomotion scenarios and different mirrored video files, and in general illustrate that the presently disclosed system and method for providing walkable VR environments are operable to deliver the seamless transition in locomotion direction that is needed to provide an immersive and realistic VR experience to a user.

Note, however, that in the implementation described above, time will appear to flow backwards when walking in the reverse track—waterfalls and raindrops will flow upwards, birds will fly backwards, the Sun will rise in the West and set in the East, etc.,—and this can disrupt a user's VR experience. In some embodiments, particularly when it is known that the VR engine will not or does not support reverse video playback (and/or when it is otherwise known that video mirroring will be performed), this time reversal phenomenon can be mitigated by traversing every path twice during the capture of raw video files with the 360-degree camera—once in the forward direction and once in the reverse direction. In some embodiments, the frames of the forward and reverse 360-degree video captures can be correlated and stitched into a single mirrored video file (still separated by a transition/mirror frame as above). In some embodiments, the forward and reverse video capture files can be stored or provided separately, with the VR engine configured to retrieve the appropriate frames from either of the two files on an as-needed basis.

In some embodiments, multiple directions of travel can be simulated within the VR environment. In particular, one or more junction points can be utilized in order to create the illusion that a user of the VR environment can freely walk in different directions, where each junction point offers one or more branching paths that the user may traverse. These branching paths are captured by the 360-degree video camera, either during the capture of the 'primary' path of the 360-degree camera or after the fact, in which case the branching path captures must be carefully synced and aligned with the prior primary path capture of the 360-degree camera. In terms of the raw video capture, a junction point can be thought of as the point at which the 360-degree camera deviates from its primary capture path. In terms of the video frames of the mirrored video file, a junction point can be thought of as the frame(s) which overlap between the video capture of the primary path and the video capture of the branching path.

After being captured, each branching path can be processed and edited in a manner similar or identical to that which was described above with respect to the primary video capture path of the 360-degree camera, e.g., the branching path video data can be stabilized, mirrored, etc. In some embodiments, the branching path(s) video frames can be appended to the mirrored video, i.e., after the reversed portion of the primary path. Additionally or alternatively, the branching path(s) video frames can be stored as individual files and/or can be combined and appended into a single branching paths file.

In some embodiments, the single mirrored video file approach might be utilized in order to avoid the I/O latency induced by requiring the VR engine to seek, open, and load a separate branching path file rather than simply having to jump to a different frame within the current mirrored video file. Accordingly, each branching path video file can be associated with a beginning and transition frame, which are stored in order to permit the VR engine to skip to appropriate portions within the branching path video files as described above with respect to the VR engine skipping between the forward and reverse video portions in the mirrored video file for the primary path.

In order to traverse an optional or branching path, a user of the walkable VR environment can approach or stop at a junction point, face the direction of the desired path with his gaze and/or his hips, and then move forward onto the selected branching path. In more general terms, a user can select a branching path by achieving a heading approximately equal to that of the branching path, using a combination of body orientation and foot motion. Depending on a calculated effective heading of the user at a given junction point, the appropriate one of the branching paths available at the given junction point will be selected and the corresponding branching path video file will be jumped to and rendered by the VR engine. If the branching path video file has been saved as a separate file, then the appropriate file can be loaded and rendered with the trigger being the user jumping from the junction point and into the given branching path. Alternatively, the underlying branching path files for all branching paths of a given junction point can be pre-emptively loaded into memory of the VR engine in response to the user initially reaching the junction point (e.g., before any action has yet been taken to deviate from the primary path and onto one of the branching paths).

In some embodiments, a junction point can be combined with a hotspot or visual indication of the junction point. This negates the need for the user of the VR environment to come to a standstill at a precise frame before being able to take an alternate branching path. Moreover, the hotspot approach also lessens the chances that the user will overshoot or undershoot the junction point, as may happen with a crossroad/perpendicular style junction. In some embodiments, the VR engine can render or overlay an outline upon the video data presented to the user, such that the outline indicates the location and direction of the upcoming branching paths. Stopping anywhere within the outline (e.g., a circle) can trigger a fade or other transition animation, before placing the user in the middle of the junction where he is able to choose amongst maintaining his current path or traveling down various branching paths available to him at the junction. In some embodiments, if the direction(s) in which a user can travel from a junction point are not obvious (e.g., the user is not in a constrained VR environment such as a hallway), then the VR engine can represent one or more of the available paths as overlays on the mirrored video data, wherein the overlays could be visually customized/adjusted or turned off as desired.

In some embodiments, a hotspot video can be associated with a junction point. A hotspot video can be provided as a 360-degree video captured from a stationary perspective at the same real-world location of the junction point presented in the mirrored video file. By triggering the VR engine to present the hotspot video when a user reaches a junction point in the mirrored video file, the impression of proper temporal flow can be maintained during periods of time in which the user might remain stationary (e.g., the user is likely to pause for a moment while considering the branching path options available at the junction point; without the hotspot video, the scene will be stationary and all moving objects will appear frozen, because only a single/limited number of frames in the mirrored video file were captured at the location of the junction point when the 360-degree camera was previously moved on a path through the real-world environment).

In the absence of a hotspot video, after selecting or reaching a junction point and selecting a branching path, the user will be loaded directly from the junction point frame(s) of their current path and into an initial frame of the video file for the selected branching path. In some embodiments, this initial frame of the branching path video can be captured in a manner that preserves visual continuity during the transition from the user's current path (and its associated video frames) to the newly selected branching path (and its separate, associated video frames). However, it is not always possible to capture branching path video in a manner that preserves visual continuity with the video frames of the parent path (i.e., the path containing the junction point), or it may not have been attempted during the capture of raw 360-degree video footage. Accordingly, in some embodiments a fade transition can be used to transition the user off of the video file for their current path/the junction point and into the video file for the selected branching path.

In some embodiments, hotspot video files can be utilized at one or more path locations besides the junction points discussed above. For example, 360-degree video footage can be recorded from one or more static locations along a given path in order to thereby create a looping scenic hotspot—if the user stops on or near this frame (which can be highlighted, e.g., by a circular outline) then the scenic video will play until the user moves on from the scenic hotspot. For example, a VR environment could be a boardwalk leading up to a waterfall and one or more scenic video hotspots presenting footage of the waterfall could be located at the end of the boardwalk or a viewing portion of the boardwalk, i.e., natural locations where a user would be expected to stop and enjoy a scenic view.

In some embodiments, one or more actors can be recorded using volumetric cameras, such that the actors can be viewed from any distance or angle. Within the presently disclosed walkable VR environment(s), the position of an actor relative to a user can therefore be changed, even as the user moves through the video. Additionally, the VR engine can continue to render the actor's movements and interactions, even when the user has stopped moving and the background 360-degree video is paused. Furthermore, in some embodiments, occlusion masks could be created (manually or with depth mapping information) to allow the actors to appear to interact with objects within the 360-degree video and/or the VR environment, e.g., an occlusion mask to allow the actor to appear to disappear behind an object. The volumetric captures of the actors can be obtained according to a script, such that a logic tree can be used to provide a simulated interaction between a user and an actor/actor avatar, wherein the next rendering or audio clip played depends upon a prior user action such as selecting an option or responding to a question. In some embodiments, the volumetric actor capture can be performed in substantially real-time, such that the actor's avatar presented in the VR environment can respond in substantially real-time to one or more user movements, dialog choices, or character states, etc.

This volumetric capture and overlay can also be utilized with avatars in the context of a simultaneous multiplayer implementation of the VR engine and VR environment of the present disclosure. For example, simultaneous multiplayer interaction can be achieved over a network, e.g., the Internet, by tracking the position of multiple different users within the mirrored video(s) of a single VR environment, such that each user is presented with his or her specific view of the mirrored video, but with the addition of other user avatars dynamically rendered as overlays or additional objects within the user's field of view, e.g., such that the other user avatars are rendered at a realistic scale and position relative to each other before being overlaid or placed in the VR environment presented to the user.

In some embodiments, animated computer graphics can be placed in or overlaid on top of the mirrored video by the VR engine, such that the animated graphics are integrated with the user's view. The overlaid animated graphics and/or environmental effects can enhance the realism of the VR environment by continuing to move even when the user is stationary (and the 360-degree video is therefore paused/frozen). For example, clouds, birds, vehicles, weather, stars, the sun, moon, etc., could be provided as animated overlay objects, either in a dynamic fashion or as a pre-rendered and stored asset that is loaded by the VR engine. In some scenarios, such as in the context of VR gaming environments, the VR engine can render or overlay computer graphics representative of collectable or interactive items. The VR engine can also provide overlays for various user interfaces, menu items or settings, one or more resource indicators, and/or one or more attribute indicators such as a health bar, items and inventory, and statistics, thereby allowing for gamified live or real-world video experiences to be presented to a user.

Additionally, environmental sound effects (such as street or natural noises) can play on a loop as a background audio track for of the VR environment, such that there is always an audio track regardless of the user's location, movement, and/or interaction with the mirrored video of the walkable VR environment. These sound effects can be dynamic, with certain tracks or events playing louder depending upon the user's location within the VR environment, and more particularly, the user's location relative to an assigned source of the sound. For example, traffic noise can be played louder as a user approaches a busy road or natural noises could be played louder when a user moves closer to an open window within a house. In some embodiments, these sound effects can also be combined with one or more of the animated computer graphics and/or volumetric camera captures described above, such that an audio clip of a bird chirping will be played louder as a user approaches an animated bird overlaid onto the mirrored video of the VR environment, or an audio portion associated with a volumetric capture of an actor will be played louder as the user approaches the rendered overlay of the actor/actor avatar in the VR environment.

Walkable 360-Degree Video Experiences & VR Environments: Example Applications Applications of the presently disclosed walkable and interactive virtual reality and 360-degree video environments include, but are not limited to: movies in which the user is an active participant or plays a starring role; movie tie-ins where the user can explore the film sets and locations and/or interact with one or more of the actors in the movie; revisiting treasured memories that were captured with a 360-degree camera or are available in an appropriate 360-degree format; virtual tourism, exploring vacation hotspots or notable cultural experiences; exploring distant and exotic locations, e.g., the Moon, Mars, foreign countries, etc.; military training and simulation; worker training, e.g., emergency services, oilfield workers, nuclear reactor operators, etc.; education; architectural and real estate walkthroughs; fitness training, etc.

The ability of the present disclosure to provide walkable VR environments and experiences from any existing or purpose-captured 360-degree video—without requiring extensive manual effort to build the VR environment—permits VR and VR-like experiences to be extended to many types of experiences and real-world locations that previously would not have made monetary sense to build a fully interactive VR environment for. For example, walkable VR experiences can be used to provide prospective buyers or interested parties with the ability to remotely engage in an immersive walk-through of a home or apartment at their own leisure. Rather than contending with the difficulties, logistics, and potential crowding associated with a traditional in-person open house, a walkthrough can be performed with one or more 360-degree cameras to capture video data along various paths traveling through as many parts of the home/property as is desired, and the captured 360-degree video can then be used to create an immersive walkable VR experience.

In a real-estate walkthrough type VR experience, a user (e.g., potential buyer) can move as quickly or slowly through the home as is desired, free to turn around or revisit certain parts of the home as needed. In some embodiments, the previously mentioned junction points can be used to link together multiple discrete paths/360-degree video files captured for individual rooms of a home, e.g., with a junction point provided at doorways, hallways, etc. of the home. Additionally, hotspot videos can be integrated within a real-estate walkthrough VR experience in order to highlight certain features of the house or address common questions/concerns that the user might have.

In some embodiments, avatar overlays and/or animated graphics can be used to provide a virtual real estate agent within the real-estate walkthrough VR environment. A real-estate agent or other knowledgeable representative can provide live audio interactions with the user, e.g., with the live audio interactions rendered by the VR engine as being spoken by an avatar or animated graphic overlay.

It is further contemplated that a user can be presented with an option to choose between different versions for any given path within a VR environment and/or different versions of the overall VR environment itself. For example, still in the context of the real-estate walkthrough VR experience, a user could be presented with a menu overlay or other interactive option that permits the user to choose a season or time of day in which a particular path of the VR environment should be presented.

Walkable VR environments can also be created by users in order to preserve or relive certain memories, such as a vacation, wedding, graduation, or other significant life event. Rather than capturing a still photograph or a conventional video, a user can instead record their life experiences with a 360-degree camera and use the presently disclosed systems and methods for walkable VR environments to explore the memory/event of the 360-degree video in a more immersive, realistic, and dynamic fashion than viewing the 360-degree video in a conventional manner. In some embodiments, a mobile application or other automated guidance system can be provided in order to assist users in the optimal capture of suitable 360-degree video(s) for use in generating walkable VR environments. For example, after the initial (forward-playing) capture of a 360-degree video, the mobile application can prompt the user to then immediately capture a second, reverse-playing capture along the same path.

User-captured 360-degree video can also be streamed to a cloud service and/or a paired mobile phone or computing device where a real-time analysis can be performed to determine the quality, suitability, or compatibility of the captured 360-degree video for use in generating a walkable VR environment. In some embodiments, the analysis can be performed onboard the 360-degree video camera. Regardless of whether performed locally at the 360-degree camera or remotely, the results of the analysis can be used to provide feedback to the user of how (or if) they can improve aspects of their 360-degree video capture to be better suitable for use in generating a walkable VR environment.

The interactive and walkable video of the present disclosure provides a low-cost and easy to produce medium that naturally integrates with an omnidirectional treadmill or other omnidirectional platform system. The presently disclosed walkable VR environments offer a far lower barrier to entry as compared to existing techniques such as 3D-modeling or photogrammetry, and can enable far more content producers, creatives and everyday users to generate virtual reality environments and virtual reality content specific to their own wants and needs. Additionally, the present disclosure offers a more convenient, efficient, and immersive manner for consumers to experience realistic virtual reality environments—particularly as 360-degree cameras become cheaper and more prevalent. By utilizing a 360-degree video clip as the input for generating a walkable VR environment, the present disclosure enables a straightforward user experience for the widespread generation of containerized VR environments, experiences, and moments. These containerized VR experiences can be used to preserve memories in lieu of traditional photographs or videos, and moreover, can be easily shared and distributed such that others can share in the experience of the individual who captured the experience on 360-degree video.

Figure 3:
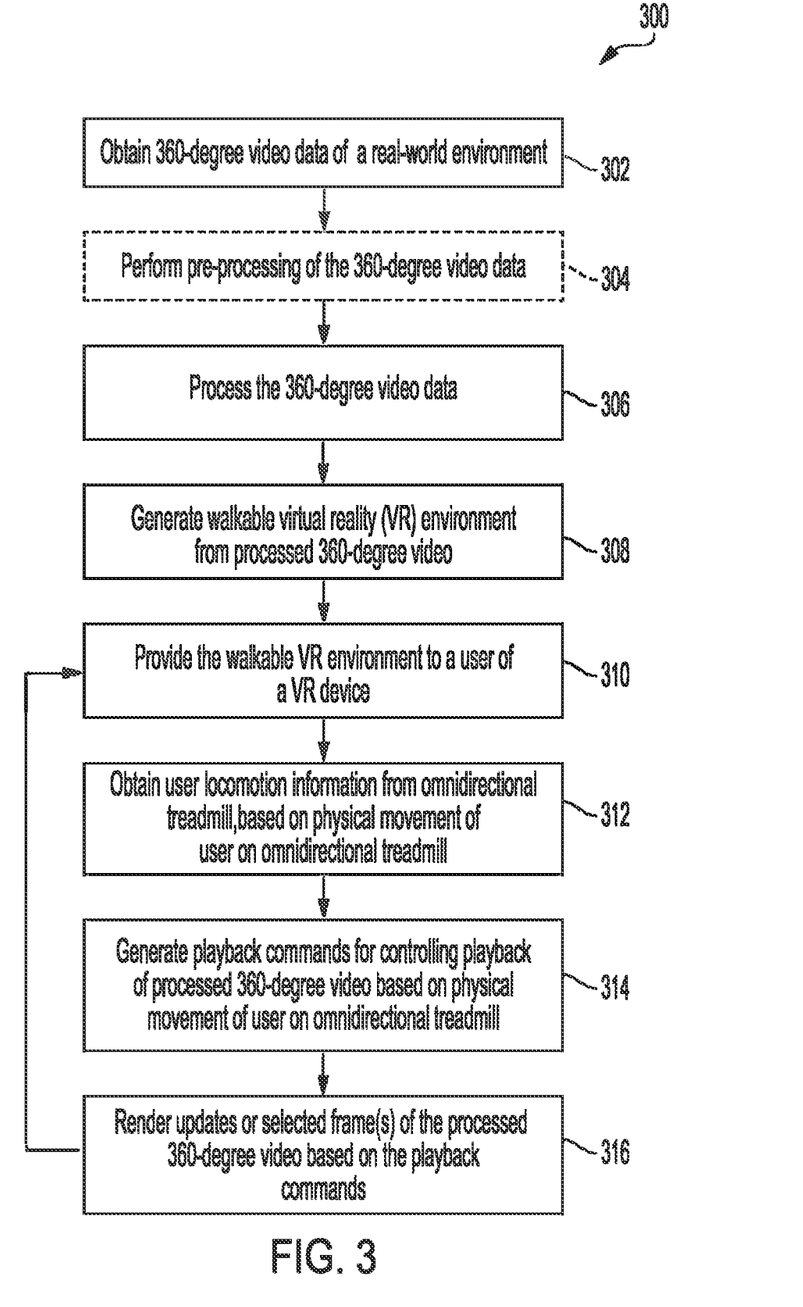
FIG. 3 depicts a flowchart illustrating an example method for generating and providing walkable VR environments and/or experiences according to one or more aspects of the present disclosure.

The disclosure turns now to FIG. 3, which is an example flowchart 300 depicting a method for providing walkable VR environments and experiences according to aspects of the present disclosure.

Beginning at 302, one or more 360-degree video data portions, files and/or clips are obtained. The 360-degree video data can be captured along a path through a real-world environment using, for example, a 360-degree camera. In some embodiments, the 360-degree video data can be generated by combining or stitching together multiple different videos taken along the same path (or portions of the same path), wherein the individual videos may be captured with a field of view that is less than 360 degrees. The 360-degree video data can be captured for the purposes of generating the presently disclosed walkable VR environment or can be existing 360-degree video data that was captured for other purposes.

At 304, optional pre-processing of the 360-degree video data can be performed. Pre-processing steps can include, but are not limited to: stabilization, adjusting playback speed, masking/cropping, top and tailing, and mirroring, e.g., as discussed previously. In general, the optional pre-processing operations can be performed to convert the raw or captured 360-degree video data into a format more suitable for use in generating the presently disclosed walkable VR environments.

At 306, the 360-degree video data (or the pre-processed video data, if the optional pre-processing operations are performed at 304) is processed and edited into a final form that will be presented to a user in the form of a walkable VR experience. For example, the 360-degree video data can be overlaid with one or more animated objects, environmental effects, and/or other effects that simulate the normal forward progress of time regardless of how the constituent frames of the 360-degree video are being rendered and presented to the user by a VR device or headset. Additionally, as has also been described previously, one or more temporal adaptations can be applied to the 360-degree video, including the generation of a mirrored video file that allows a user to travel along the capture path of the video in either the forward direction (e.g., the same direction that the 360-degree camera traveled when capturing the video) or the reverse direction (e.g., the opposite direction of that which the 360-degree camera traveled when capturing the video. The mirrored video file can comprise the forward-playing 360-degree video file and a reversed copy, with its first frame deleted, appended after the final frame of the forward-playing 360-degree video file. A transition frame can be used to demarcate the boundary between the forward and reverse playing portions of the mirrored video file, where the transition frame and the last frame of the forward-playing video portion are the same. Additionally, one or more location correlations can be generated, with each location correlation associating one or more frames of the 360-degree video (e.g., an individual frame or a series of consecutive frames) with a corresponding location along the first path.

At 308, a walkable VR environment is generated from the mirrored (or otherwise processed) 360-degree video file and the one or more location correlations. For example, a location correlation can indicate that a given frame was captured at a point that is 75% of the way along the length of the path associated with the 360-degree video, thereby allowing a VR engine to render that given frame in response to a determination that the user has reached the 75% point of that same path in the context of the walkable VR environment. In this manner, the walkable VR environment extends the input 360-degree video by making it responsive to user locomotion inputs and other user actions/inputs that may be provided to the VR engine or device.

At 310, the walkable VR environment is provided to the user at their VR device, e.g., on the display of a VR headset. Providing the walkable VR environment can include render and displaying the individual frames of the 360-degree video as well as processing, rendering and displaying any overlay or other interactive elements specified for inclusion in the walkable VR environment.

At 312, one or more user locomotion parameters and a user orientation are obtained. This information can be obtained in substantially real-time, e.g., streamed from one or more sensors and/or from the user's VR device itself. In some embodiments, the information can be obtained as individual, discrete pieces of information. In some embodiments, the information can be obtained as a set of time-series data, e.g., collected (and optionally averaged or otherwise processed) over a short time interval, which can be on the order of a fraction of a second. The user locomotion parameters can include a direction of movement and a speed of movement. From the user locomotion parameters and user orientation, a current user location within the walkable VR environment can be inferred or calculated, for example by using a dead-reckoning process.

At 314, one or more frames are selected from the mirrored 360-degree video, where the selection is based on the user locomotion parameters and orientation, the calculated current user location, or some combination of the two. The selection can also be made based on an analysis of the calculated current user location against the location correlations, such that the most appropriate frame or set of frames is displayed given the user's location along the path/within the walkable VR environment.

At 316, the selected frames are rendered and displayed on the VR device of the user. In some embodiments, the selected frames can be provided as an update or display refresh presented to the user, and can be calculated for every frame refresh of the VR device (e.g., selected frames would be calculated and provided as an update 30 times per second for a 30-fps display, 60 times per second for a 60-fps display, etc.) The selected frame in this context refers to the discrete choice of "frames" or individual units in which the 360-degree video was captured or otherwise is provided to the VR device. Additional rendering and calculation operations are performed in order to render the specific field of view within a given frame, where the specific field of view is rendered to correspond to the orientation of the user's gaze at that particular moment (e.g., a "frame" covers the entire 360-degree sphere captured by the 360-degree camera, but the user's field of view is only a subset of this 360-degree sphere and must be calculated accordingly).

From 316, the method returns to 310 by providing the updated walkable VR environment to the user as described above and awaiting a further indication or receipt of user locomotion parameters/orientation at the next time step or rendering epoch.

Figure 2A:
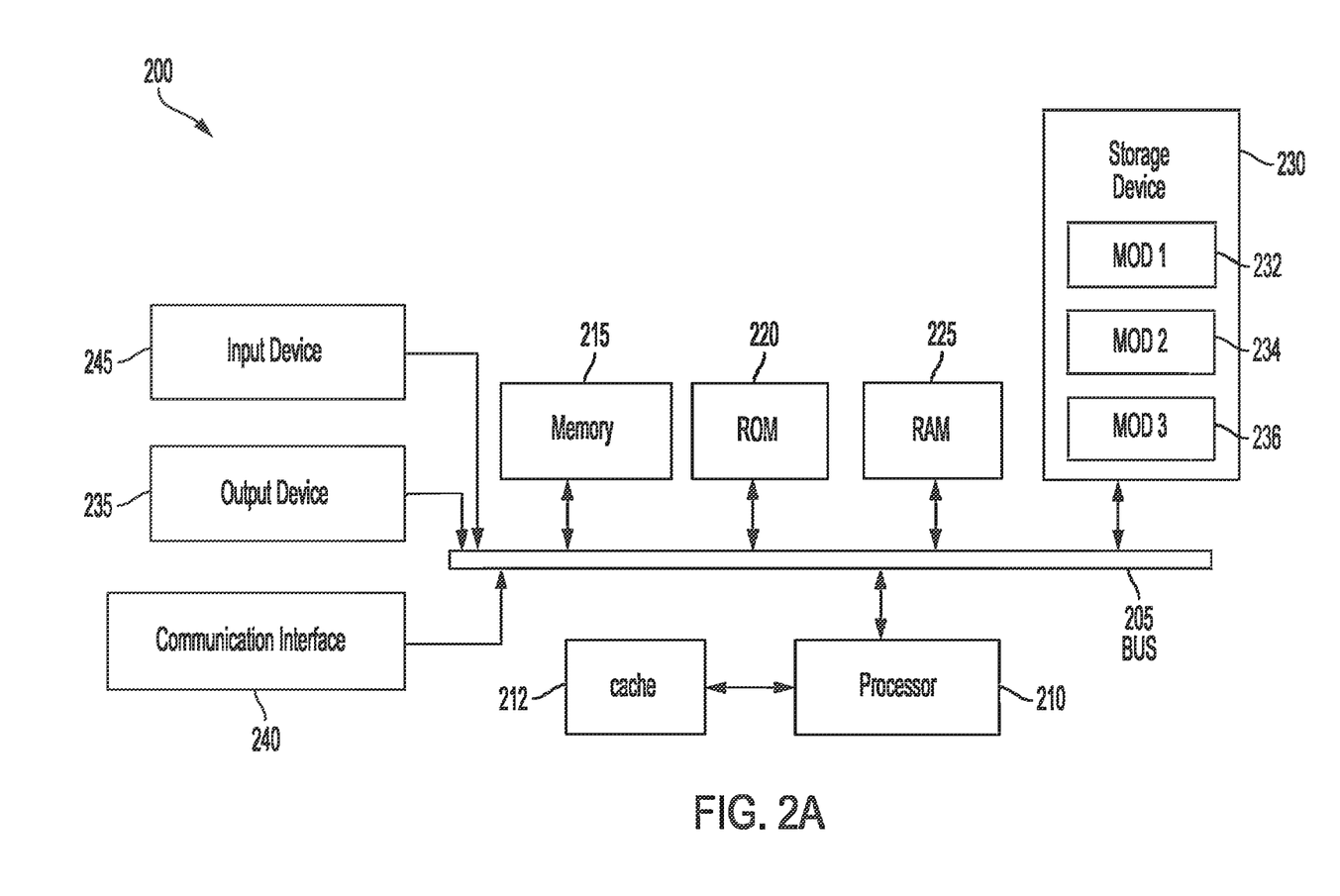
FIG. 2A depicts an example system bus computing system architecture in which one or more aspects of the present disclosure may be implemented.
Figure 2B:
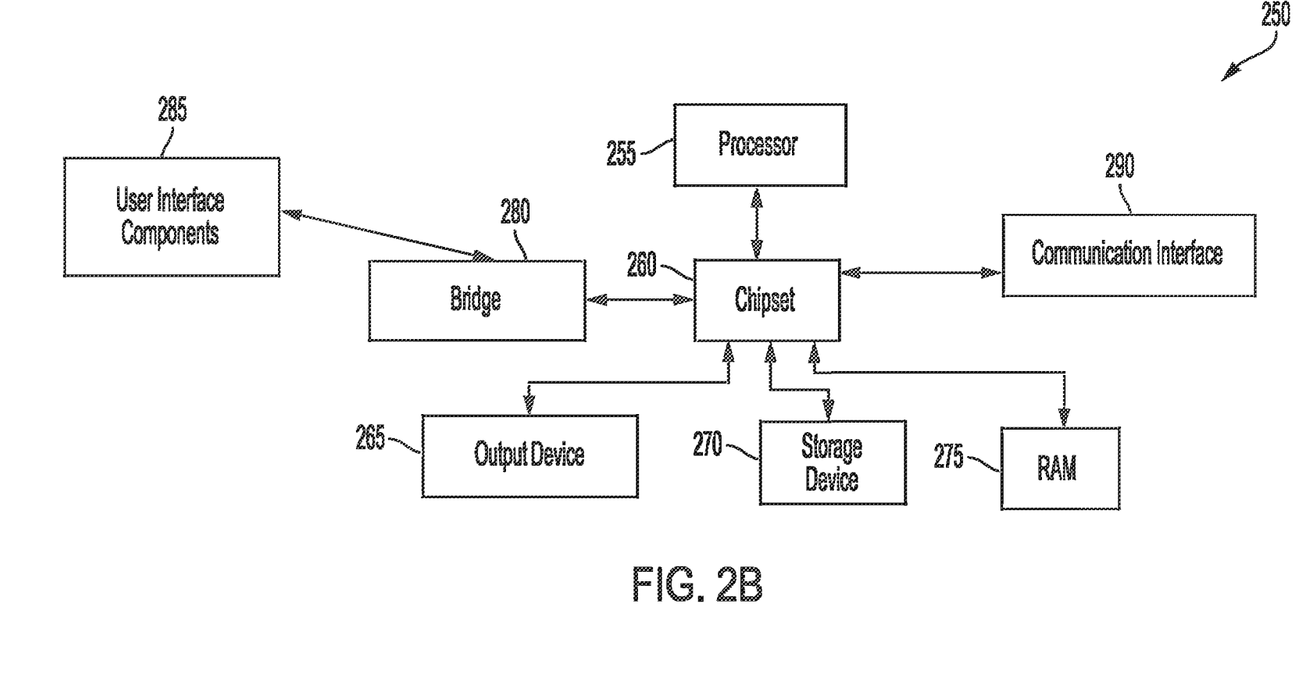
FIG. 2B depicts an example computer system chipset architecture in which one or more aspects of the present disclosure may be implemented.

FIGS. 2A and 2B illustrate example system embodiments in which aspects of the present disclosure may be provided. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general-purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates an example computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output device 265, such as a display, and can read and write information to storage device 270, which can include magnetic media, and solid-state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255. It can be appreciated that example systems 200 and 250 can have more than one processor 210 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software. In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general-purpose computer, special-purpose computer, or special-purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

What is claimed is:

1. A method comprising:
   receiving locomotion information from one or more sensors, wherein the locomotion information is generated based on physical movement of a user within an omnidirectional treadmill;
   generating, using the received locomotion information, one or more playback commands for controlling playback of one or more of a plurality of processed 360-degree videos, wherein the plurality of processed 360-degree videos are generated from 360-degree video data obtained by traversing one or more of a plurality of paths through a real-world environment, the plurality of processed 360-degree videos including a plurality of virtual paths corresponding with the plurality of paths through the real-world environment,
   wherein at one or more locations along the plurality of virtual paths at least two of the plurality of virtual paths intersect.

2. The method of claim 1, further comprising:
   generating, based on the plurality of processed 360-degree videos, a walkable virtual reality (VR) environment including the plurality of virtual paths.

3. The method of claim 1, wherein the received locomotion information includes a direction of locomotion on the omnidirectional treadmill.

4. The method of claim 1, wherein the received locomotion information includes a speed of locomotion.

5. The method of claim 4, wherein an elapsed time between rendering one or more frames of the plurality of processed 360-degree videos is proportional to the speed of locomotion.

6. The method of claim 1, wherein the one or more playback commands includes adjustments to a playback speed of the plurality of processed 360-degree videos.

7. The method of claim 1, further comprising:
   calculating a direction of virtual movement along a virtual path, the calculating based on the received locomotion information; and
   obtaining one or more frames from the plurality of processed 360-degree videos in response to a determination that the calculated direction of the virtual movement corresponds to a traversal direction in which the 360-degree video data was captured along a path of the plurality of paths through the real-world environment.

8. The method of claim 1, wherein processing the 360-degree video data to generate the processed 360-degree videos comprises performing one or more of:
   stabilization;
   top and tailing;
   cropping;
   adjusting playback speed; and
   mirroring.

9. A system comprising:
   at least one processor; and
   a memory having instructions therein, which when executed by the at least one processor cause the system to:
      receive locomotion information from one or more sensors, wherein the locomotion information is generated based on physical movement of a user within an omnidirectional treadmill;
      generate, using the received locomotion information, one or more playback commands for controlling playback of one or more of a plurality of processed 360-degree videos, wherein the plurality of processed 360-degree videos are generated from 360-degree video data obtained by traversing one or more of a plurality of paths through a real-world environment, the plurality of processed 360-degree videos including a plurality of virtual paths corresponding with the plurality of paths through the real-world environment,
      wherein at one or more locations along the plurality of virtual paths at least two of the plurality of virtual paths intersect.

10. The system of claim 9 further comprising instructions, which when executed by the at least one processor, causes the system to:
    generate, based on the plurality of processed 360-degree videos, a walkable virtual reality (VR) environment including the plurality of virtual paths.

11. The system of claim 9, wherein the received locomotion information includes a direction of locomotion on the omnidirectional treadmill.

12. The system of claim 9, wherein the received locomotion information includes a speed of locomotion.

13. The system of claim 12, wherein an elapsed time between rendering one or more frames of the plurality of processed 360-degree videos is proportional to the speed of locomotion.

14. The system of claim 9, wherein the one or more playback commands includes adjustments to a playback speed of the plurality of processed 360-degree videos.

15. The system of claim 9, further comprising instructions, which when executed by the at least one processor, causes the system to:
    calculate a direction of virtual movement along a first virtual path, the calculating based on the received locomotion information; and
    obtain one or more frames from the plurality of processed 360-degree videos in response to a determination that the calculated direction of the virtual movement corresponds to a traversal direction in which the 360-degree video data was captured along a path of the plurality of paths through the real-world environment.

16. The system of claim 9, wherein processing the 360-degree video data to generate the processed 360-degree video data comprises performing one or more of:
    stabilization;
    top and tailing;
    cropping;
    adjusting playback speed; and
    mirroring.

17. At least one non-transitory computer-readable medium storing instructions therein, which when executed by at least one processor cause the at least one processor to:
    receive locomotion information from one or more sensors, wherein the locomotion information is generated based on physical movement of a user within an omnidirectional treadmill;
    generate, using the received locomotion information, one or more playback commands for controlling playback of one or more of a plurality of processed 360-degree videos, wherein the plurality of processed 360-degree videos are generated from 360-degree video data obtained by traversing one or more of a plurality of paths through a real-world environment, the plurality of processed 360-degree videos including a plurality of virtual paths corresponding with the plurality of paths through the real-world environment,
    wherein at one or more locations along the plurality of virtual paths at least two of the plurality of virtual paths intersect.

18. The at least one non-transitory computer-readable medium of claim 17, further comprising instructions, which when executed by the at least one processor, causes the at least one processor to:
    generate, based on the plurality of processed 360-degree videos, a walkable virtual reality (VR) environment including the plurality of virtual paths.

19. The at least one non-transitory computer-readable medium of claim 17, wherein the received locomotion information includes a direction of locomotion on the omnidirectional treadmill.

20. The at least one non-transitory computer-readable medium of claim 17, wherein the received locomotion information includes a speed of locomotion.

* * * * *